United States Patent [19]

Schmidt et al.

[11] Patent Number: 5,106,506
[45] Date of Patent: Apr. 21, 1992

[54] FILTER STACK FOR INSERTION IN A FILTER DEVICE

[75] Inventors: Hans-Weddo Schmidt, Hardegsen; Michael Dohrmann, Gleichen, both of Fed. Rep. of Germany

[73] Assignee: Sartorius AG, Göttingen, Fed. Rep. of Germany

[21] Appl. No.: 592,973

[22] Filed: Oct. 4, 1990

[30] Foreign Application Priority Data

Oct. 17, 1989 [DE] Fed. Rep. of Germany ....... 3934564

[51] Int. Cl.⁵ ............................................. B01D 29/60
[52] U.S. Cl. ............................. 210/321.84; 210/346; 210/486; 210/488; 55/510
[58] Field of Search ................... 210/321.84, 346, 486, 210/488; 55/510

[56] References Cited

U.S. PATENT DOCUMENTS

| | | | |
|---|---|---|---|
| 3,872,015 | 3/1975 | Madsen | 210/346 |
| 4,228,014 | 10/1980 | Timm et al. | 210/347 |
| 4,576,715 | 3/1986 | Michaels et al. | 210/486 |
| 4,956,085 | 9/1990 | Kopf | 210/321.84 |

Primary Examiner—Robert A. Dawson
Assistant Examiner—Wanda L. Millard
Attorney, Agent, or Firm—Eric P. Schellin

[57] ABSTRACT

In a filter device with a filter stack (32) which is held in sealing position by two end plates (9, 2). At least one of which comprises fluid connections (3, 4, 5), and consists of round flat-filter elements (41) and alternatingly arranged, congruent, draining support elements (38), the end plate (2) comprising the fluid connections (3, 4, 5) is part of a housing (1, 2) surrounding the filter stack (32) and the peripheral approach flow of the filter stack (32) takes place via an annular housing space (11). The filter stack (32) is penetrated approximately in the direction of its diameter by a slot-like shaft (30, 30') for the fluid guidance of the retentate which shaft empties in the end plate (2) comprising the fluid connections (3, 4, 5). At least one permeate shaft (31) for removing the permeate from the plane of the filter elements (41) is arranged in the diametric end area of the stack surface. The permeate shafts (31) empty in the end plate (2) with connections (3, 4, 5). The support elements (38) which guide the fluid charged with particles are formed by overflow plates (38) with overflow conduits (39) located on both sides and running transversally to the slot-like shaft (30, 30') and each two filter blanks (36) are located under draining spacing by means of a drainage means between two overflow plates (38) for guiding the retentate and the permeate.

6 Claims, 4 Drawing Sheets

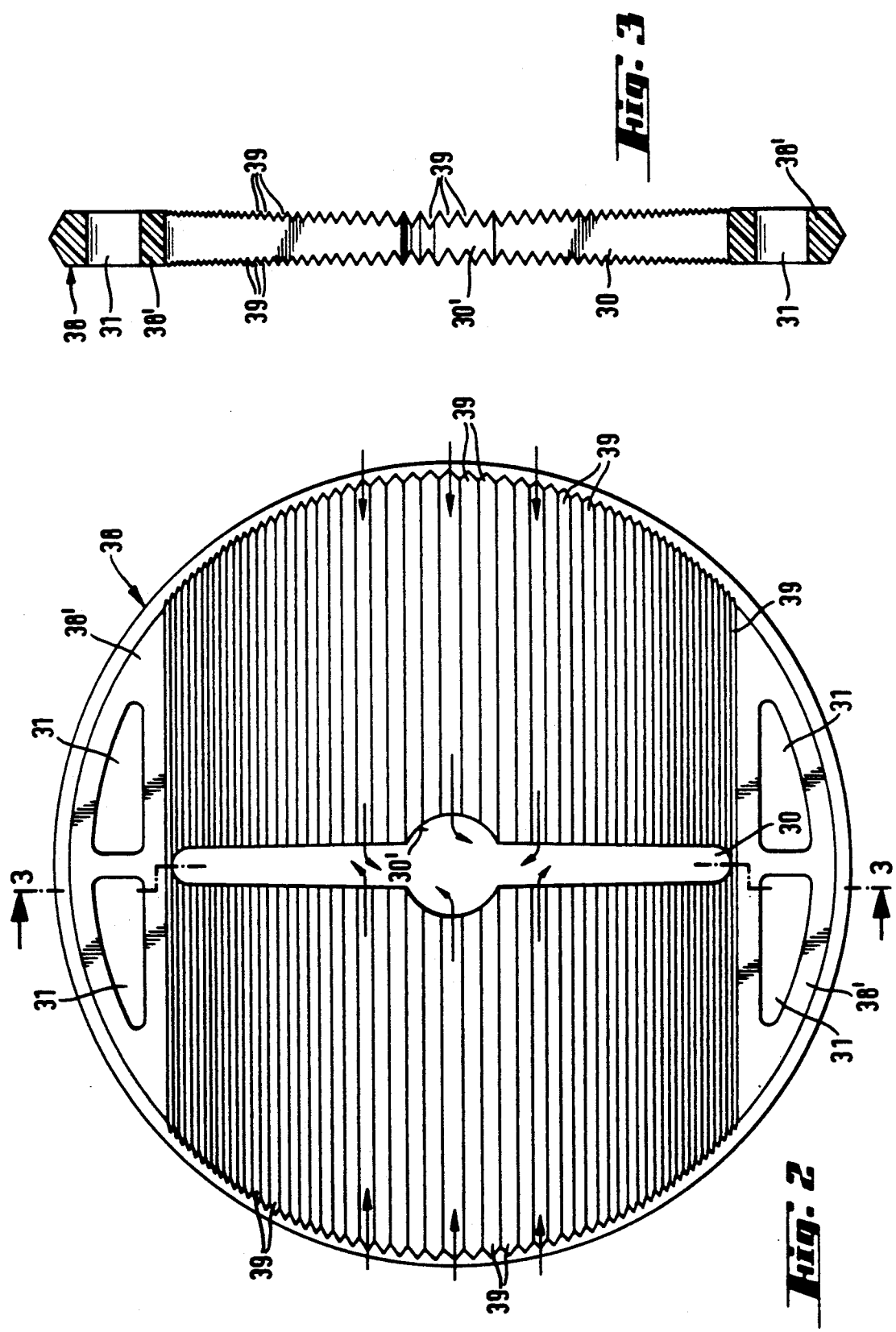

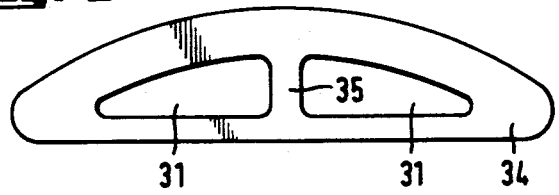
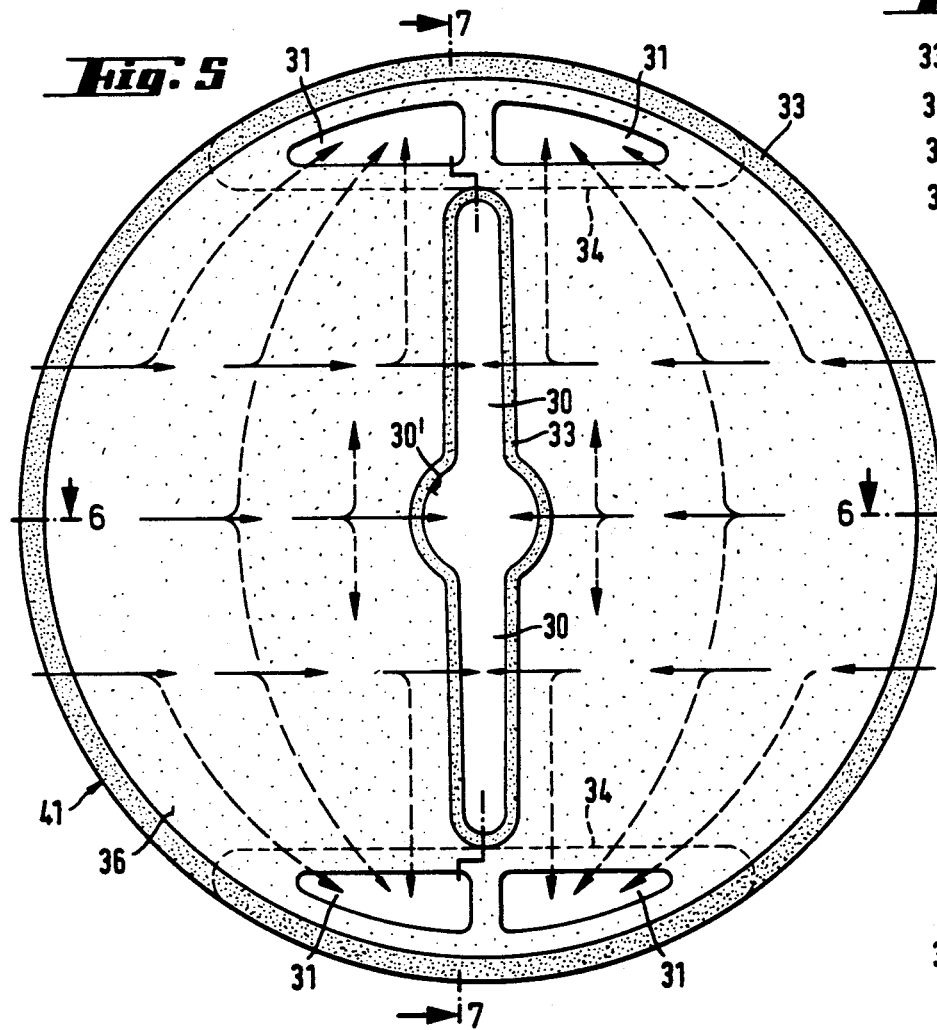
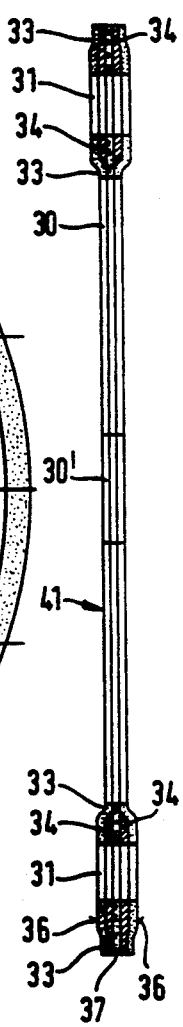
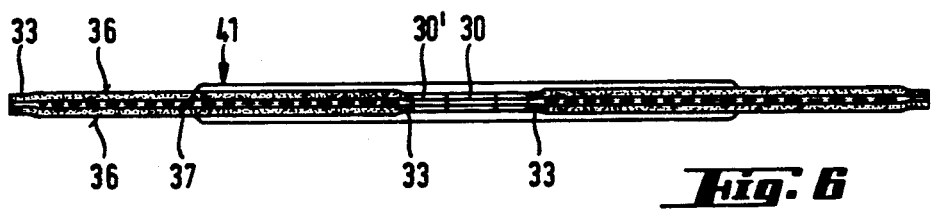

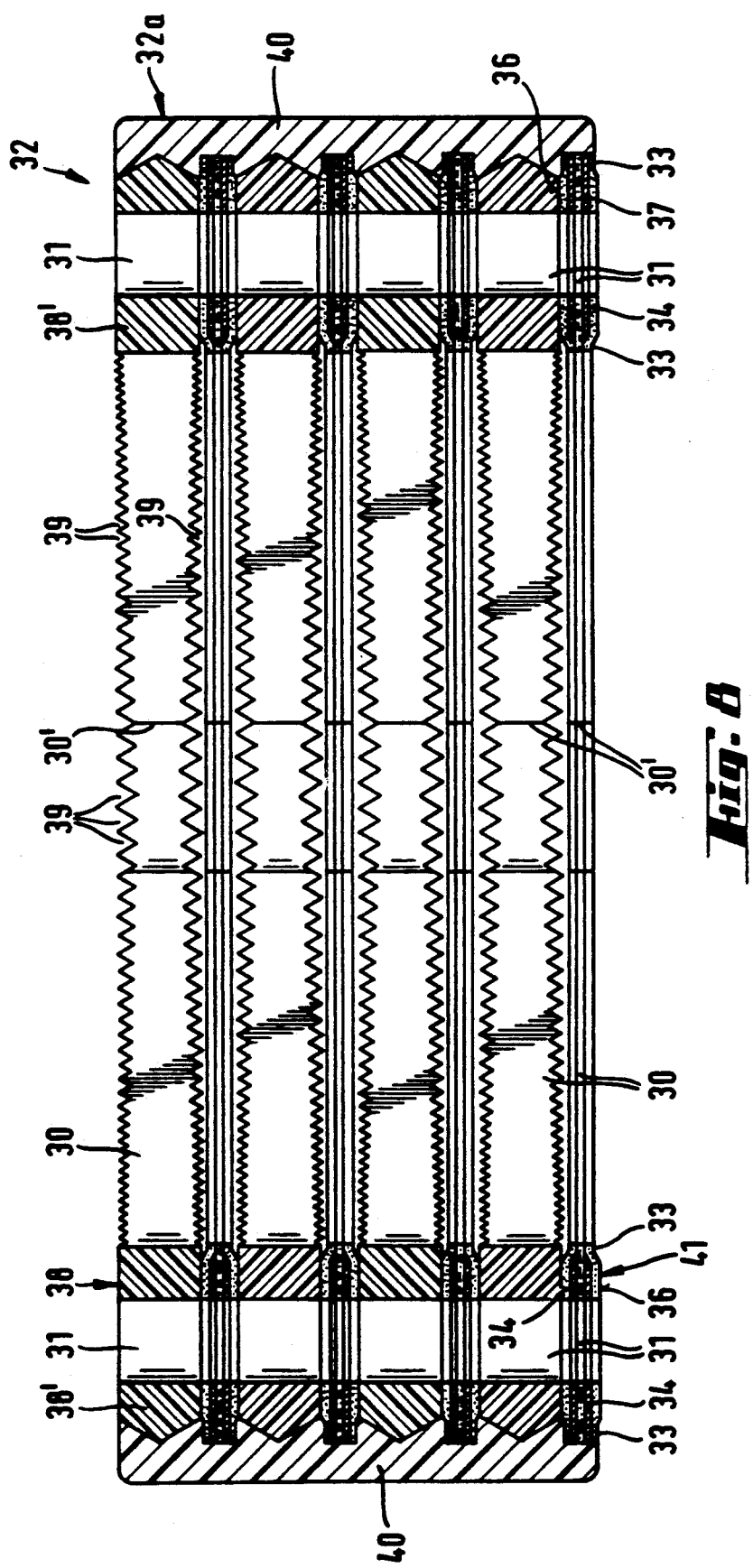

5,106,506

FILTER STACK FOR INSERTION IN A FILTER DEVICE

BACKGROUND OF THE INVENTION

The invention relates to a filter stack for use in a for fluids which can be operated according to the cross-flow principle in accordance with the technology known from DE-OS 33 41 262. The stack-like separating element described therein and consisting of layered blanks between two end plates could be improved as regards its flow guidance if it is a question of achieving as low a pressure drop as possible between retentate entrance and retentate exit without this being at the expense of the filtration performance.

A certain pressure on the filtrate side is necessary in particular in the filtration of liquids with a high $CO_2$ content like beer, fruit juices with a strong $CO_2$ content and the like in order to avoid a degassing of $CO_2$ from the liquid. This necessitates a rather high pressure level on the retentate side in order to make the filtration possible at all, that is, the entire filtration system must be pressure-stable toward the outside.

On account of the relatively small perforations in the stack-like separating element according to DE-OS 33 41 262, overflowing of the membrane is prevented by the strong pressure drop between retentate entrance and retentate exit. This can potentially bring about a rapid buildup of a cover layer with associated dropping filtration performance. In particular the approach flow openings tend to become blocked in the case of media with a high solid and particle component such as e.g. fruit juices and also in the case of a filtration of highly viscous liquids such as milk and whey.

It is also known from DE-GM 87 00 793 that bell-shaped filter elements consisting of ceramics can be stacked axially with spacing around a hollow core formed by them in a surrounding pressure housing and that the slots formed between the bell-shaped filter elements on the outer side and on the inner side can be flowed over in the direction of the jacket lines in accordance with the cross-flow principle. The removal of filtrate takes place from rim positioned hollow spaces in the ceramic bodies. As a result of the special shaping, the manufacture is limited to solid and form-stable materials and is very complicated.

The invention therefore has the task of creating with simple constructive means a filter device of the initially mentioned design, especially for the filtration of media with a high solid component or particle component, which can be operated at a rather high operating pressure, in which the pressure drop is relatively small within the flow paths and in which the use of various types of separating media in accordance with the same sealing principle of the individual elements is possible.

SUMMARY OF THE INVENTION

The invention consists of a filter housing with filter stack or of a filter stack intended for use in a filter housing with the following features.

In a filter device for liquids which can be operated according to the cross-flow principle with a filter stack which is held in sealing position by two end plates, at least one of which comprises fluid connections, and consists of round flat-filter elements and alternatingly arranged, congruent, draining support elements. The end plate comprising the fluid connections is part of a housing surrounding the filter stack and the peripheral approach flow of the filter stack takes place via an annular housing space. The filter stack is penetrated approximately in the direction of its diameter by a slot-like shaft for the fluid guidance of the retentate which shaft empties in the end plate comprising the fluid connections. At least one permeate shaft for removing the permeate from the plane of the filter elements is arranged in the diametric end area of the stack surface not comprehended by the slot-like shaft. The permeate shafts empty in the end plate with connections. The support elements which guide the fluid charged with particles are formed by overflow plates with overflow conduits located on both sides and running transversally to the slot-like shaft and each two filter blanks are located under draining spacing by means of a drainage fleece or grid between two overflow plates for guiding the retentate and the permeate. Since the sum of the approach-flow cross sections in the slot-like perforation is approximately equal to that of the outer approach flow cross sections in the outer retentate space, a feed reversal can be readily carried out without an elevation of pressure in the inner retentate shaft. Liquids charged with particles and high solid components can be economically filtered with the filter device.

BRIEF DESCRIPTION OF THE INVENTION

The attached drawing shows an example of an embodiment of the present invention.

FIG. 2 shows a top view of an overflow plate.

FIG. 3 shows a cross section through the overflow plate along section line 3—3 in FIG. 2.

FIG. 4 shows a top view of a pressure distribution mask.

FIG. 5 shows a top view of the multilayer filter element.

FIG. 6 shows a cross section through the filter element along line 6—6 in FIG. 5.

FIG. 7 shows a longitudinal section through the filter element along line 7—7 in FIG. 5.

FIG. 8 shows a vertical section through a part of the filter stack approximately in accordance with the drawing of FIG. 1 and along section lines 3—3 and 7—7.

Figure 1:
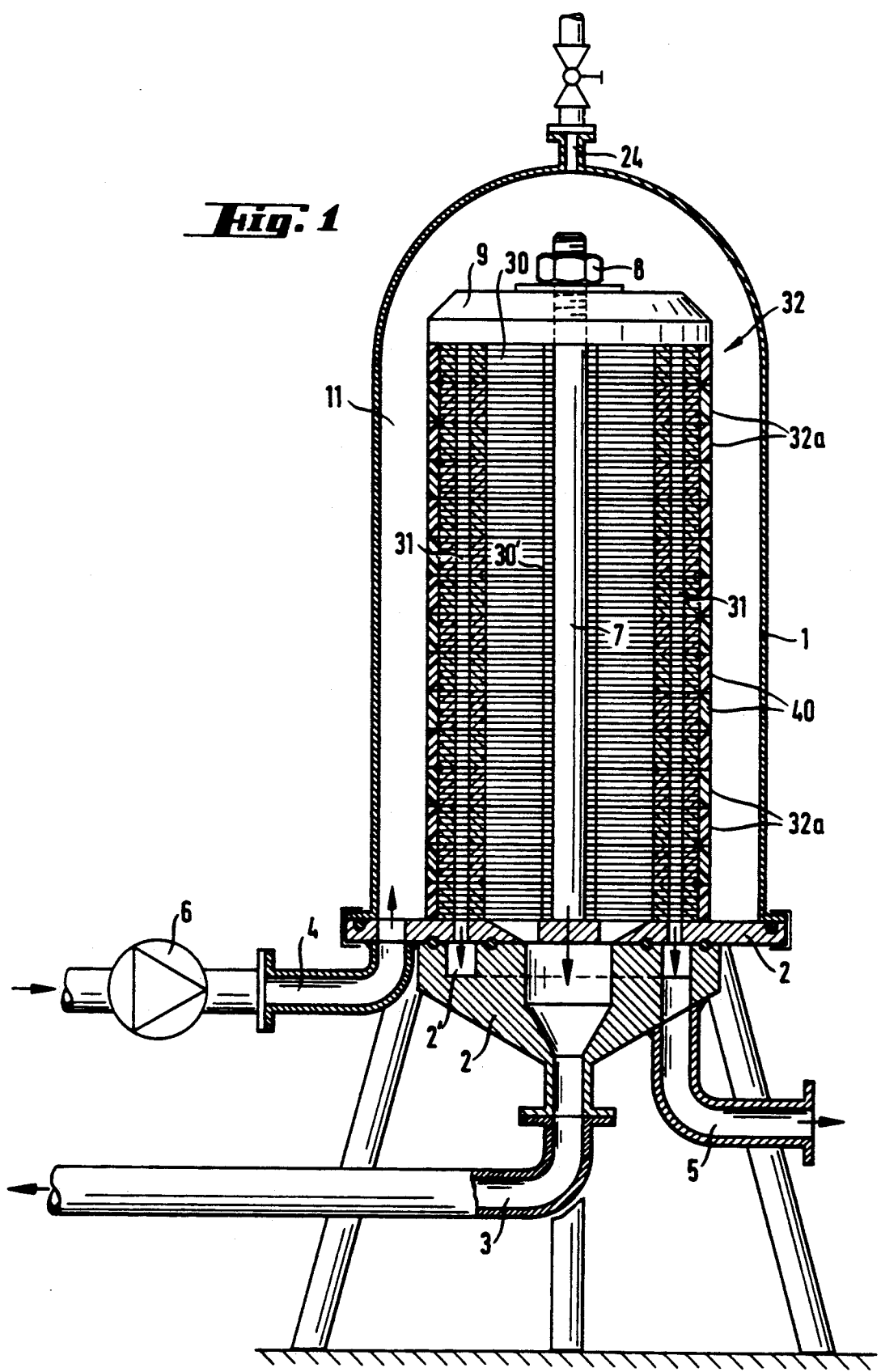
FIG. 1 shows a schematic view of a vertical section through a filter device for fluids.

The filter device according to FIG. 1 consists essentially of a bell-shaped upper housing part 1, a lower housing part 2 which is detachably connected thereto via clamping elements with seals and which preferably comprises the fluid connections 3, 4, 5. Housing 1, 2 is supplied via fluid pump 6 with liquid via connection 4 which flows over filter stack 32 located in housing 1, 2 in retentate space 11, preferably from the outside toward the inside. The concentrated retentate leaves filter stack 32 and housing 1, 2 through central retentate space 30 via connection 3. The permeate penetrating filter elements 41 leaves filter stack 32 through permeate shafts 31 and permeate outlet 5 in lower end plate 2. Annular space 2' located in lower housing part 2 connects all permeate passages and permeate shafts 31 to permeate outlet 5. The entire filter stack 32 is held in sealing position by means of pressure plate 9 as upper end plate and clamp bolt 7 with nut 8, which bolt is suitably connected to lower end plate 2. Nut 8 can also be replaced by a clamping means according to DE-OS 37 80 733 which is designed to compensate expansion forces of filter stack 32. Housing 1, 2 can be vented via a connection 24.

FIGS. 2 to 8 show the various individual elements. The layer sequence consists, viewed from above in FIG. 1, of overflow plate 38 according to FIGS. 2, 3 which comprises central slot-shaped perforation 30, 30' and several perforations 31 for the permeate arranged over the circumference in the end area of this perforation 30, 30'.

Perforations 3±1 are enclosed by flat rims 38' as a press seal.

A filter element according to FIGS. 5 to 7 is located below this upper overflow plate 38, which plate is optionally provided with a smooth outer surface. The hole pattern of this filter element as regards perforations 30, 30', 31 coincides with that of overflow plate 38. This filter element 41 consists of an upper and a lower flat filter blank 36 and of a draining fleece 37 or a fabric sandwiched therebetween, whose peripheral edges are connected in an inclusive and leakproof manner in the area of central, slot-like perforation 30 by means of welding or adhesion as seal 33. If necessary, a pressure distribution mask 34 is located between draining support layer 37 in the form of a fleece or fabric and flat filter blanks 36 on both sides which mask assures that the permeate can flow in an unimpeded fashion in the plane of draining support layer 37 into perforations 31 for removal of the permeate, as is schematically indicated in FIG. 5. The pressure distribution mask comprises a recess 31 with middle piece 35, which recess coincides with perforations 31 of filter element 41. Pressure distribution mask 34 is advantageously fixed in an immovable manner in seal 33 of filter element 41. Perforations 31 can also be formed by several round punched holes.

This filter element 41 is followed again by an overflow plate 38, etc. as is indicated in FIGS. 1 and 8.

As is apparent from FIGS. 2 and 3, overflow conduits 39 running transversally to slot-like central perforation 30 are located toward the outside on one plane but have different depths, widths and lengths.

The different lengths of overflow conduits 39 for the retentate which result from the plate geometry and the central slot-like perforation selected can be compensated by means of a continuous cross-sectional constriction of overflow conduits 39 starting from the greatest diameter and proceeding to the periphery (shortening of the length of the overflow conduits) in order to provide for a uniform wall shearing stress on the membrane surface. Thus, filter stack 32 formed therewith is not flowed over radially but rather from the outside toward the middle in the direction of retentate slot 30, 30' in a parallel manner. The flow goes around all sides of filter stack 32, so that no dead corners are produced in housing 1, 2 or in overflow conduits 39 or shafts 30, 30', 31. This is especially important after cleaning cycles. The retentate as well as the permeate are drawn off at the bottom of filter housing 1, 2.

Overflow plates 38 are designed specifically to suit the application, preferably injected molded from plastic or designed as fine-steel plates with an etched profile, and thus constitute reusable elements. If needed, several filter elements 41 and overflow plates 38 stacked on top of each other in accordance with FIG. 8 can be combined by connection elements to filter modules 32a, as can also be seen from FIG. 1, so that it is easier to handle them. These connection elements can be formed according to FIG. 8 e.g. by an injection-mold consisting of plastic or a silicone mass around the outside in the area of perforations 31 or by clamps arranged in the area of the middle webs of permeate shafts 31.

The selection of flat filter blanks 36 as regards pore size and retention capacity, material and loadability depends on the fluids to be filtered. The slot height between two flat-filter blanks 36 and drainage blanks 37 located therebetween likewise depends on the requirements of the fluids to be treated and is achieved by the selection of suitable fabric thicknesses or fleece thicknesses as well as by an appropriate selection of the thickness of pressure-distribution masks 34. Flat fleeces with slight compressibility and good drainage properties are preferred as fleeces. These fleeces can also form a laminate with filter 36. If necessary, the use of pressure-distribution masks 34 can be eliminated in the case of these fleeces.

The material of pressure-distribution masks 34 depends on the application. It should preferably be hard and non-compressible, e.g. polypropylene, polyester, metal foil, PVDF in order to prevent the membrane from pressing into the fleece or fabric structure to be held open in the discharge area. The thickness of the pressure-distribution masks is between 50 and 150 $\mu m$, depending on the application.

In order to achieve a low pressure drop between retentate entrance 4 and retentate exit 3, the flow preferably passes from the outside toward the inside in the filtration of liquids containing $CO_2$, namely, with an elevated operating pressure in housing 1, 2 with simultaneous throttling of filtrate outlet 5 in order to also achieve a pressure increase on the permeate side of the filter system. This avoids a foaming and degassing of the liquid.

It is also advantageous in the filtration of highly viscous liquids such as milk and whey for the flow to pass from the outside to the inside in order that the pressure loss between retentate entrance 4 and retentate exit 3 is as low as possible. This delays the formation of a covering layer on the filter blanks.

The slot height between filter elements 41 to be flowed over and overflow plates 38 and overflow conduits 39 is between 200 to 1000 $\mu m$, depending on the fluid to be filtered.

The overflow plate can also be formed by a stamped plastic sheet comprising overflow conduits 39 and level plate rims 38'. The notched peaks of overflow conduits 39 project thereby over the plane of plate rims 38' on one side or on both sides. The support surfaces for filter elements 41, which surfaces are located in one plane, can be achieved over the entire plate level by means of placed-on compensation masks (34) in the form of plate rims 38'.

The advantage of the filter device of the invention with its overflow and sealing principle also resides in the variability and exchangeability of the blanks and in the possibility of being able to adapt to different conditions of filtration in a closed pressure system with variable operating pressure and differential pressure without great expense. Since the sum of the approach-flow cross sections in slot-like perforation 30, 30' is approximately equal to that of the outer approach-flow cross sections in retentate space 11, it is also possible to perform a smooth feed reversal without an increase in pressure in retentate shaft 30, 30'. As a result of the closed system, no leakage losses occur, which is important in the area of biotechnology as regards the danger of microbic contamination, secondary contamination, polluting, etc.

We claim:

1. In a filter stack for insertion into a filter device for fluids which device can be operated according to the cross-flow principle, which filter can be operated according sealing position between two end plates, at least one of which comprises fluid connections, comprising round flat-filter elements and alternatingly arranged, draining support elements, whereby the stack of elements in the center comprises a shaft-like perforation and several shaft-like perforations distributed between the central perforation and the periphery over the circumference for the separate guidance of retentate and permeate, whereby the shaft-like perforations end in the end plate with the fluid connections, the improvement which comprises a filter stack (32) which is penetrated approximately in the direction of the diameter by a slot-like shaft (30, 30') for guiding the retentate which empties in an end plate (2) comprising a plurality of fluid connections (3, 4, 5) including at least one permeate shaft (31) for removing the permeate from the plane of the filter elements (41) which is located in the diametric end area of the stack surface not comprehended by the slot-like shaft (30, 30'), whereby the permeate shafts (31) empty into the end plate (2) with said connections (3, 4, 5), that the support elements (38) which guide the fluid charged with particles are formed by overflow plates (38) with overflow conduits (39) located on both sides and running transversely to the slot-like shaft (30, 30'), including two filter blanks (36) which are located under a fluid collection space by means of a drainage means between two overflow plates (38) for conveying the retentate and the permeate and including overflow conduits (39) which empty peripherally in a fluid pressure space (11) of the said device in the inserted state of the filter stack and wherein the permeate shafts (31) are surrounded, by a thin pressure distribution mask (34) located between the filter blanks (36) and a drainage plane.

2. The filter stack according to claim 2, wherein the pressure distribution mask (34) is between about 50 to 150 um thick.

3. The filter stack according to claim 2, wherein the overflow plates (38) for the retentate are formed from plastic polymer.

4. The filter stack according to claim 3, wherein the overflow plate is formed by a stamped foil comprising overflow conduits (39) and circumferential level plate rims (38').

5. The filter stack according to claim 4, wherein the level plate rims (38') are reinforced in the are of the overflow conduits (39) by masks approximately having a plate thickness.

6. The filter stack according to claim 2, wherein the periphery and the edge of the slot-like perforation (30, 30') of two filter blanks (36) with surrounding drainage element (37) are enclosed in a leakproof manner.

* * * * *